(12) United States Patent
Manago et al.

(10) Patent No.: US 8,059,390 B2
(45) Date of Patent: Nov. 15, 2011

(54) ELECTROLYTIC CAPACITOR

(75) Inventors: Daisuke Manago, Saga (JP); Shinji Kodera, Saga (JP); Hitoshi Ibuta, Osaka (JP); Kunio Shibata, Tochigi (JP)

(73) Assignees: Sanyo Electric Co., Ltd, Osaka (JP); Saga Sanyo Industries Co., Ltd, Kishima-gun (JP); Furukawa Precision Engineering Co., Ltd, Tochigi (JP)

( * ) Notice: Subject to any disclaimer, the term of this patent is extended or adjusted under 35 U.S.C. 154(b) by 371 days.

(21) Appl. No.: 12/485,107

(22) Filed: Jun. 16, 2009

(65) Prior Publication Data
US 2009/0316337 A1 Dec. 24, 2009

(30) Foreign Application Priority Data
Jun. 18, 2008 (JP) ................. 2008-159001

(51) Int. Cl.
*H01G 9/04* (2006.01)
(52) U.S. Cl. ........ 361/531; 361/523; 361/525; 361/528; 361/540; 361/516; 29/25.01; 29/25.03

(58) Field of Classification Search ............... 361/523, 361/516–519, 525, 528–529, 530–531, 540–541; 29/25.01, 25.03
See application file for complete search history.

(56) References Cited

U.S. PATENT DOCUMENTS

| | | | |
|---|---|---|---|
| 6,850,405 B1 * | 2/2005 | Mileham et al. | 361/302 |
| 6,967,829 B2 * | 11/2005 | Seitz et al. | 361/522 |
| 7,116,548 B2 * | 10/2006 | Satterfield et al. | 361/528 |
| 7,233,485 B2 * | 6/2007 | Fujimoto et al. | 361/531 |
| 7,262,953 B2 * | 8/2007 | Ozawa et al. | 361/503 |

FOREIGN PATENT DOCUMENTS
JP 11-283870 10/1999
* cited by examiner

*Primary Examiner* — Nguyen T Ha
(74) *Attorney, Agent, or Firm* — Turocy & Watson, LLP

(57) ABSTRACT

To provide an electrolytic capacitor having lead wires excellent in weldability with a boss member made of aluminum, excellent in solder wettability, and less whisker. The lead wires have a nickel plating layer in a thickness of 0.3 to 5.0 μm, a palladium plating layer in a thickness of 0.01 to 0.10 μm, and a gold plating layer in a thickness of 0.002 to 0.030 μm.

3 Claims, 4 Drawing Sheets

ELECTROLYTIC CAPACITOR

BACKGROUND OF THE INVENTION

1. Field of the Invention

The present invention relates to an electrolytic capacitor to be used for various kinds of electronic appliances. Particularly, the present invention relates to an improvement of lead wires led out from a capacitor element.

2. Description of the Related Art

Conventionally, as capacitors for high frequency ranges, laminated ceramic capacitors have been used. However, these capacitors have a relatively small capacitance. Therefore, as compact capacitors having a large capacitance and a relatively low equivalent series resistance (hereinafter, abbreviated as ESR), electrolytic capacitors employing a valve metal such as tantalum and aluminum have been widely used. In particular, solid electrolytic capacitors employing electrically conductive polymers such as polypyrroles, polythiophenes, and polyanilines, or TCNQ (7,7,8,8-tetracyanoquinodimethane) complex salts as their electrolytes have attracted attention.

A solid electrolytic capacitor of the foregoing type is fabricated in the following manner. First, an anode foil formed by etching and anodizing an aluminum foil and a cathode foil formed by etching an aluminum foil are respectively prepared. Then, an anode lead tab welded with a lead wire and a cathode lead tab welded with a lead wire are fixed to the anode foil and the cathode foil, respectively. Thereafter, the anode foil and the cathode foil are wound around in a cylindrical form with a separator interposed therebetween to form a capacitor element. Further, cut edge formation and a heat treatment are carried out for the capacitor element. Next, the capacitor element is immersed in a solution containing a monomer and an oxidizing agent, and thereafter, thermal polymerization is effected, whereby a conductive polymer layer (a solid electrolyte layer) is formed between the electrode foils of the capacitor element. Subsequently, the capacitor element is accommodated and secured in an outer casing having an opening part at one end side thereof, then the opening part of the outer casing is sealed with a sealing body having through-holes to lead out the respective lead wires, and further an aging process is performed. After a seat plate is placed, the respective lead wires are led out to the outside through lead inserting through-holes of the seat plate placed on the sealing body side and press-worked and bent to form electrode terminals, so that a solid electrolytic capacitor is completed.

In an electrolytic capacitor described above, respective lead wires of the electrolytic capacitor are electrically connected with electrode foils by welding one end sides of the lead wires with aluminum boss members of lead tab terminals connected with the electrode foils. Further, the other end sides of the lead wires led out through lead inserting through-holes of a seat plate are soldered with a mount board as electrode terminals. Accordingly, in the electrolytic capacitor, one end sides of lead wires are required to be excellent in weldability with the boss members made of aluminum and the other end sides of the lead wires are required to be excellent in solder wettability. Therefore, in general, lead wires having plating layers such as a silver plating layer, a tin plating layer, or a tin-bismuth based alloy plating layer on the surface of a substrate such as a copper wire are used.

However, in the case of forming a solid electrolyte layer containing an electrically conductive polymer such as a polythiophene type conductive polymer between electrode foils, since monomers are thermally polymerized in a capacitor element to which lead wires are connected as described above, a sulfidizing gas is generated from the monomers and dopant agents at the time of the thermal polymerization. In a case where such a sulfidizing gas is generated, in a lead wire having a silver plating layer, the silver plating layer is polluted with the sulfidizing gas, resulting in a problem that the silver plating layer is discolored and solder wettability of the lead wire is lowered. It is supposed to be possible to wash the lead wire after the thermal polymerization; however the silver plating layer is also discolored with a sulfur component in air and therefore in industrial production, there is also a case where an electrolytic capacitor is left for a long time until the electrolytic capacitor is soldered with a mount board after production of the electrolytic capacitor. From this reason, there is a problem that the silver plating layer discolors with the lapse of time and it results in decrease of solder wettability.

On the other hand, with respect to a capacitor element to which lead wires having a tin plating layer or a tin-bismuth based alloy plating layer are connected, the plating layer tends to be melted due to high temperature at the time of the thermal polymerization in production process or heat treatment of electrode foils and a separator. Therefore, there is a problem that a diameter of the lead wire tends to become uneven. Further, there is also a problem that in lead wires having a tin plating layer or a tin-bismuth based alloy plating layer, whisker occurs easily. Furthermore, the whisker tends to be generated easily by using an electrolytic capacitor under high temperature environments. Therefore, in the case of using lead wires having a tin plating layer or a tin-bismuth based alloy plating layer, short circuit may possibly be caused between an anode lead wire and a cathode lead wire.

As described above, defective products tend to be produced by using lead wires coated with any of the plating layers and it may possibly result in a problem of decrease of productivity and a problem of defective short circuit.

In a chip-shaped electrolytic capacitor, in order to improve solderability and ESR, formation of a copper plating layer, a nickel plating layer, a palladium plating layer, and a gold plating layer on the surface of a lead frame made of a nickel-iron based alloy in a thickness of about 100 μm has been also proposed. (See, for example, Japanese Unexamined Patent Publication No. 11-283870) However, there is still a problem that even the plating layers formed on this lead frame fail to attain sufficient weldability between boss members made of aluminum and lead wires having small diameters.

SUMMARY OF THE INVENTION

The present invention has been made to solve the above-mentioned problems and an object of the present invention to provide an electrolytic capacitor having lead wires excellent in weldability with boss members made of aluminum, scarcely deteriorated in solder wettability even by a sulfidizing gas in production process or a sulfur component in air, and free from whisker generation which is observed in a tin plating layer or the like.

According to one aspect of the present invention, there is provided an electrolytic capacitor comprising a capacitor element having an anode foil connected with an anode lead tab terminal and a cathode foil connected with a cathode lead tab terminal that are wound with a separator interposed therebetween, an outer casing housing the capacitor element, and a sealing body for sealing an opening part of the outer casing, wherein the anode lead tab terminal and the cathode lead tab terminal respectively have a lead wire welded with a boss member of the lead tab terminal and led out to the outside, wherein the lead wires respectively have a nickel plating layer, a palladium plating layer, and a gold plating layer in this order on the surface of a substrate, and the nickel plating layer has a thickness of 0.3 to 5.0 μm, the palladium plating layer has a thickness of 0.01 to 0.10 μm, and the gold plating layer has a thickness of 0.002 to 0.030 μm.

According to one aspect of the present invention, it is possible to provide an electrolytic capacitor having lead wires excellent in weldability with boss members made of aluminum, showing sufficient durability to a sulfidizing gas in production process or a sulfur component in air, and thereby having excellent in solder wettability, generating no whisker which is observed in a tin plating layer or the like, and thereby scarcely causing short circuit defects.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Figure 1:
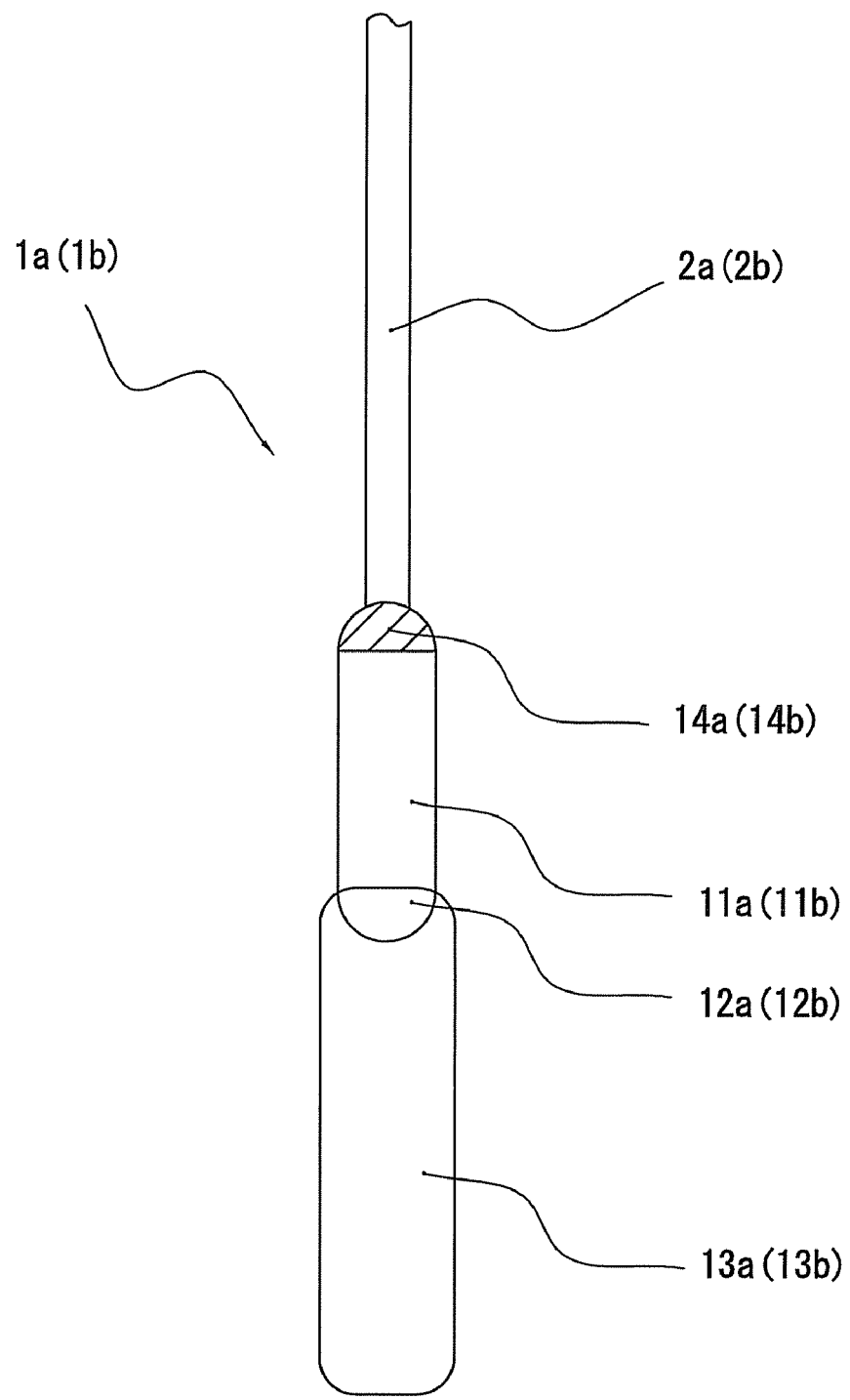
FIG. 1 is a schematic plane view showing one example of a lead tab terminal according to the embodiment of the invention.
Figure 2:
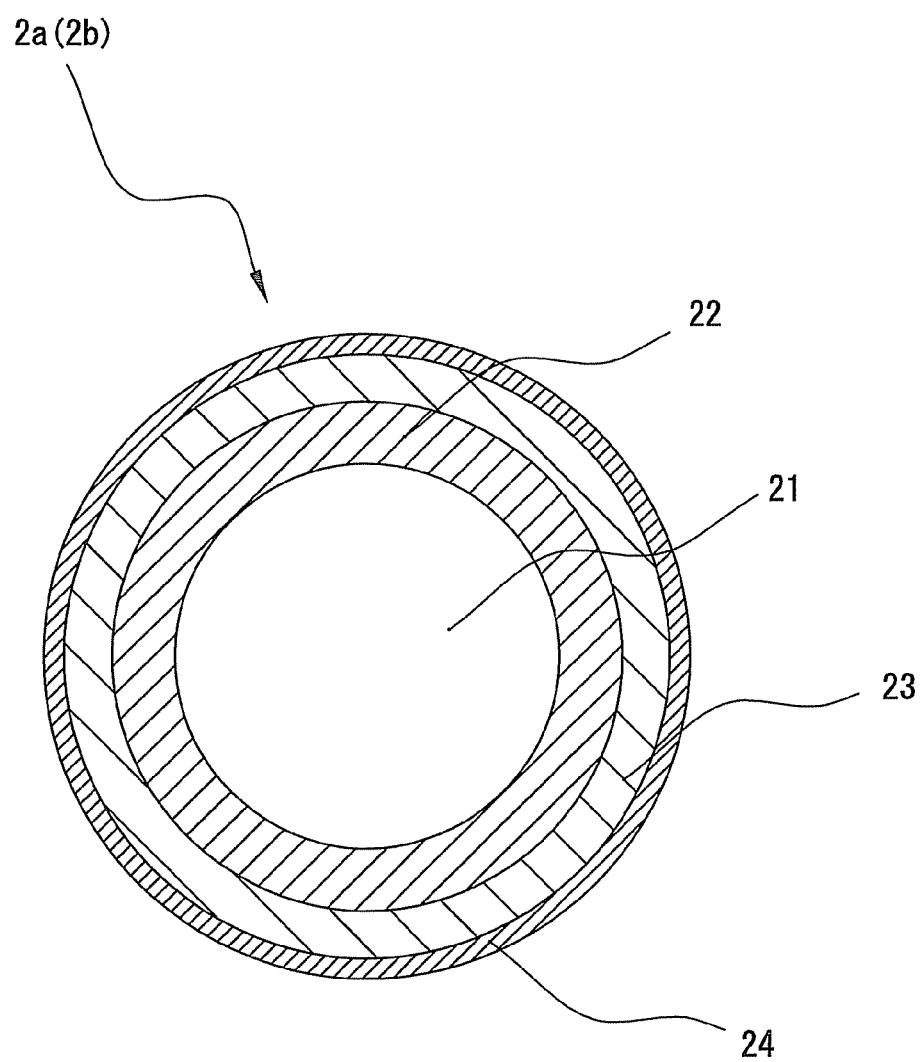
FIG. 2 is a schematic cross-sectional view showing a lead wire of FIG. 1.

FIG. 1 is a schematic plane view showing one example of a lead tab terminal of the present embodiment and FIG. 2 is a schematic cross-sectional view showing the lead wire of FIG. 1. The configurations of a cathode lead tab terminal and a cathode lead wire are the same as those of an anode lead tab terminal and an anode lead wire and therefore, the respective lead tab terminals are described using the same drawing.

As shown in FIG. 1, an anode lead tab terminal 1a and a cathode lead tab terminal 1b respectively have boss members 11a, 11b, rib members 12a, 12b, and flat members 13a, 13b, formed by shaping substrates. An anode lead wire 2a and a cathode lead wire 2b are connected by welding to weld portions 14a, 14b of the boss members 11a, 11b, respectively.

In this embodiment, as shown in FIG. 2, a nickel plating layer 22, a palladium plating layer 23, and a gold plating layer 24 are continuously formed in this order on the surface of a substrate 21 of the lead wires 2a, 2b. Since the lead wires 2a, 2b are used as electrode terminals to be soldered with a mount board, the lead wires 2a, 2b are required to have excellent solder wettability and also since in the weld portions 14a, 14b, the lead wires 2a, 2b are connected with boss members 11a, 11b made of aluminum by resistance welding, the lead wires 2a, 2b are required to have excellent weldability with aluminum. In order to obtain high welding strength by resistance welding, a plating layer having a high resistance value needs to be formed on the substrate. However, a gold plating layer 24 of the outermost layer, formed for soldering has a low resistance value. From the above viewpoint, according to the results of investigations on a plating layer which satisfies both solder wettability and weldability, it is found that if the nickel plating layer 22 having a thickness in a range of 0.3 to 5.0 μm, the palladium plating layer 23 having a thickness in a range of 0.01 to 0.10 μm, and the gold plating layer 24 having a thickness in a range of 0.002 to 0.030 μm are formed on the substrate in this order; even in lead wires 2a, 2b having small diameters, excellent weldability with the boss members 11a, 11b made of aluminum, high welding strength, and excellent solder wettability can be attained.

If the gold plating layer 24 of the outermost layer has a thickness thinner than 0.002 μm, the solder wettability is lowered. On the other hand, if the gold plating layer 24 is formed with a constant thickness, excellent solder wettability can be attained and therefore, if the gold plating layer 24 has a thickness thicker than 0.030 μm, that effect is saturated and it results in disadvantage in terms of the cost. Consequently, the gold plating layer 24 is required to have a thickness in a range of 0.002 to 0.030 μm and preferably in a range of 0.002 to 0.010 μm.

Further, in a case where the palladium plating layer 23 of an intermediate layer has a thickness thinner than 0.01 μm, even forming the nickel plating layer 22 and the gold plating layer 24 which have thicknesses within the above ranges, the solder wettability is lowered and weldability also becomes insufficient due to difficulty to secure a constant resistance value. On the other hand, if the palladium plating layer 23 is formed with a constant thickness, excellent solder wettability and excellent weldability can be attained and therefore, if the palladium plating layer 23 has a thickness thicker than 0.10 μm, that effect is saturated and it results in disadvantage in terms of the cost. Consequently, the palladium plating layer 23 is required to have a thickness in a range of 0.01 to 0.10 μm and preferably in a range of 0.01 to 0.05 μm.

Furthermore, in a case where the nickel plating layer 22 of the lowest layer having a contact with the surface of the substrate 21 has a thickness thinner than 0.3 μm, even forming the palladium plating layer 23 which has a thickness within the above range, a constant resistance value cannot be attained and weldability is lowered and it becomes difficult to secure sufficient welding strength. On the other hand, if the nickel plating layer 22 is formed with a constant thickness, excellent weldability can be attained and therefore, if the nickel plating layer 22 has a thickness thicker than 5.0 μm, that effect is saturated and it results in disadvantage in terms of the cost. Consequently, the nickel plating layer 22 is required to have a thickness in a range of 0.3 to 5.0 μm and preferably in a range of 0.3 to 2.0 μm.

Conventionally known plating methods may be used in a method for forming the respective plating layers. Specific examples of the method include an electrolytic plating method, an electroless plating method, a hot-dip plating method, an ultrasonic plating method, a vapor deposition plating method, a displace deposition plating method, and the like. Among them, an electrolytic plating method can be preferably used since a uniform plating layer can be formed.

A substrate to be used for the lead wire in the present embodiment may be an Oxygen-Free Copper wire (OFC wire), a Copper-Plated steel wire (CP wire), and the like. Among them, an Oxygen-Free Copper wire is preferable for the purpose of lowering ESR of an electrolytic capacitor. The diameter of the substrate is preferably 0.3 to 1.0 mm.

Figure 3:
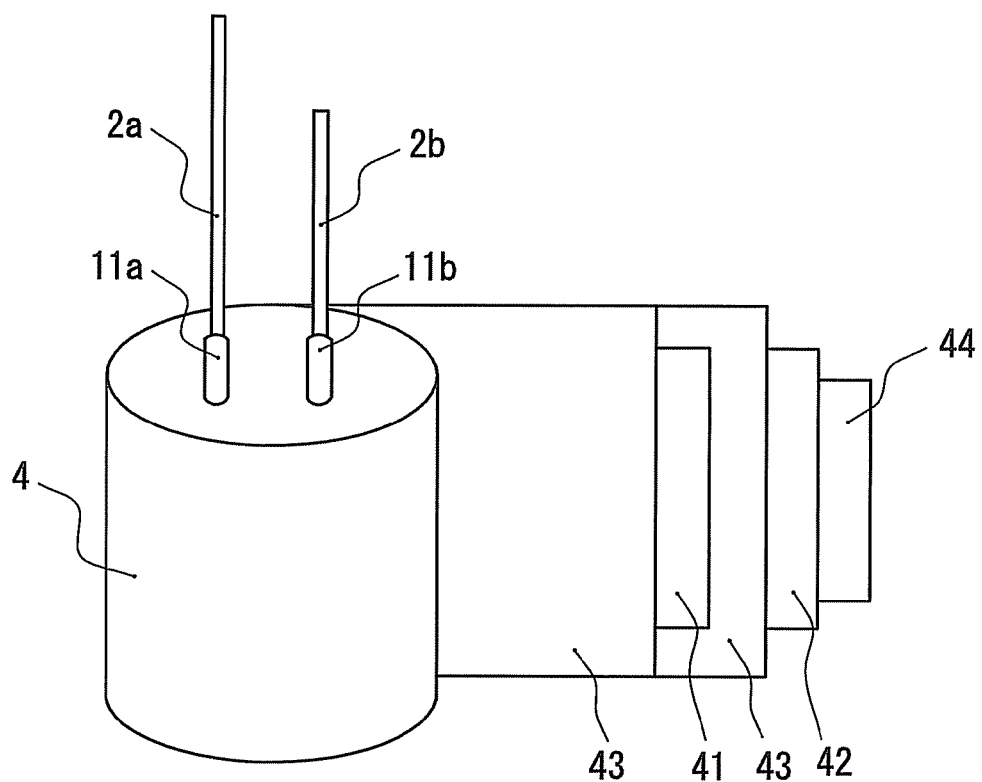
FIG. 3 is a schematic perspective view showing one example of a capacitor element according to the embodiment of the invention.
Figure 4:
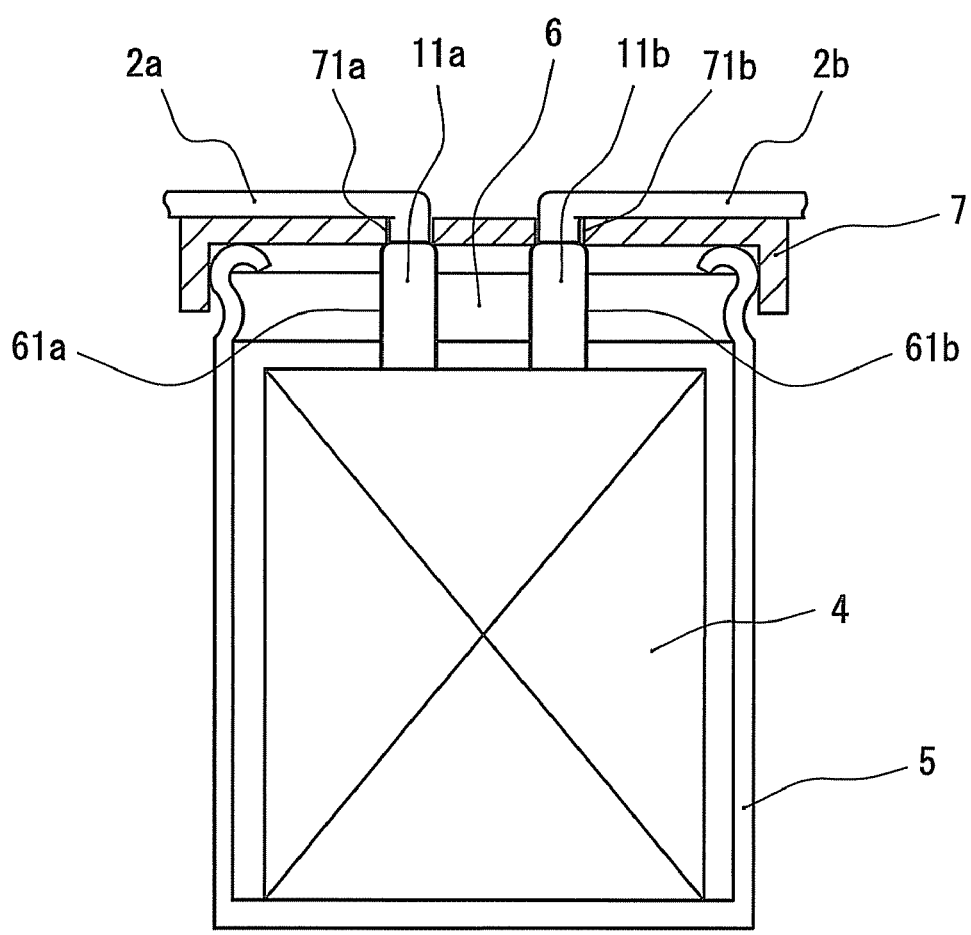
FIG. 4 is a schematic cross-sectional view showing one example of an electrolytic capacitor according to the embodiment of the invention.

Next, an electrolytic capacitor according to the present embodiment will be described. FIG. 3 is a schematic perspective view showing one example of a capacitor element of the present embodiment in which the respective electrode lead tab terminals welded with the above lead wires are connected, and FIG. 4 is a schematic cross-sectional view showing one example of an electrolytic capacitor of the present embodiment using the capacitor element of FIG. 3.

As shown in FIG. 3, a wound type capacitor element 4 is formed by winding an anode foil 41 subjected to etching process and anodizing process as described below and an opposite cathode foil 42 subjected to etching process with a separator 43 therebetween. This anode foil 41 is a foil which is made of such a valve metal as aluminum, tantalum, niobium or titanium and which is subjected to the etching process for roughing the surface and the anodizing process for forming the dielectric layer. The anode foil 41, the opposite cathode foil 42, and the separator 43 are wound and thereafter fixed by a winding end tape 4. The anode foil 41 and the opposite cathode foil 42 are respectively connected with flat members 13a, 13b (not illustrated) of the respective lead tab terminals 1a, 1b and the boss members 11a, 11b of the respective lead tab terminals 1a, 1b are welded with the lead wires 2a, 2b by resistance welding.

A capacitor element 4 formed as described above is subjected to cut edge treatment and a heat treatment at 150-300° C. Thereafter, a solid electrolyte layer containing TCNQ complex salts or electrically conductive polymers is formed in the capacitor element 4. Since the respective lead wires 2a, 2b of the present embodiment have a gold plating layer formed as an outermost layer and have no tin plating layer, the plating layer is not melted even by the heat treatment described above and therefore, a diameter of the lead wire does not become uneven.

In a case where a solid electrolyte layer is formed in a capacitor element 4, for example, a monomer such as thiophene and pyrrole, which is polymerized into an electrically conductive polymer, and an oxidizing agent such as ammonium persulfate, sodium persulfate, and transition metal salts are immersed in the capacitor element 4 and then, the above-mentioned monomer is thermally polymerized. When the thermal polymerization is carried out, a sulfidizing gas is generated; however since the respective lead wires 2a, 2b of the present embodiment have a gold plating layer as an outermost layer and have no silver layer, no discoloration is caused even by the sulfidizing gas and therefore solder wettability is not lowered.

As shown in FIG. 4, the electrolytic capacitor of the present embodiment includes a bottomed cylindrical outer casing 5 housing the capacitor element 4 in which a solid electrolyte layer is formed as described above, a sealing body 6 for sealing an opening part of the outer casing 5, and a seat plate 7 for mounting the electrolytic capacitor on a mount board on the end surface of the sealing body side.

In a case where the lead wires 2a, 2b are led out, first, boss members 11a, 11b are inserted respectively into through holes 61a, 61b of the sealing body 6. Thereafter, the outer casing 5 made of aluminum is subjected to drawing process and curling process. After that, the lead wires 2a, 2b led out through the through holes 61a, 61b of the sealing body 6 are inserted into lead inserting through-holes 71a, 71b of the seat plate 7 and the lead wires 2a, 2b are bent in the root portions near the lead inserting through-holes 71a, 71b substantially at 90 degree in the directions apart from each other along the seat plate plane. Since the lead wires 2a, 2b of the present embodiment have no tin plating layer, no whisker is generated. Therefore, there is no need to carry out heat treatment or processing treatment for removing whisker or there is no risk of occurrence of short circuit defects due to whisker.

In the following, examples and comparative examples are used to describe the present invention in more detail. The present invention, however, is not limited to them.

EXAMPLES

Lead wires were produced by successively forming the respective plating layers shown in Table 1 on the surfaces of substrates by an electrolytic plating method. Lead tab terminals were produced using these lead wires and weldability of each lead wire of a lead tab terminal with a boss member made of aluminum was evaluated by the following weldability test.

Further, separately from the above weldability test, each solid electrolytic capacitor having a solid electrolyte layer containing polythiophene in a capacitor element was produced by using each produced lead tab terminal. Thereafter, each lead wire was cut out of the solid electrolytic capacitor and solder wettability of the lead wire was evaluated by the following solder wettability test.

The type of lead wires and the evaluation results are shown in Table 1.
[Weldability Test]

Each measurement sample was produced by attaching a weight of 0.5 kg to the tip end of each lead wire in such a manner that the lead wire side of each lead tab terminal was set to be the lower side in the axial direction. While the load was applied to this measurement sample in the axial direction and the boss member of the measurement sample was grasped with a hand, the measurement sample is subjected to two cycles of a following bending process. One cycle of the bending process consist steps of: bending the lead wire at 90 degree near the boss member, turning back the lead wire to the initial state, bending the lead wire at 90 degree in the opposed direction, and turning back the lead wire to the initial state. Those having no fracture in the weld portion after the test were evaluated to be "Good" and those having fracture was evaluated to be "Bad".
[Solder Wettability Test]

The solder wettability was evaluated by a soldering test (equilibrium method) regulated in JIS C 60068-2-54. Z. C. T. (zero cross time) was measured, which was the duration from a time point of zero action force value at which a solder surface and each lead wire were firstly brought into contact with each other to a time point when the action force value again became zero due to starting wetting of the lead wire after receiving floating force. An ethanol solution containing 25% by mass of rosin was used as a flux and a lead-free solder (temperature: 245° C.) was used as a solder bath. In the evaluation of the solder wettability of the lead wire having a silver plating layer of Comparative Example 7 and the lead wire having a tin plating layer of Comparative Example 8, in order to eliminate an effect of heat or a sulfidizing gas at the time of producing solid electrolytic capacitors, simple bodies of the lead wires were used as measurement samples without producing solid electrolytic capacitors.

TABLE 1

|  | Gold plating layer (μm) | Palladium plating layer (μm) | Nickel plating layer (μm) | Substrate | Weldability | Z.C.T. (sec) |
|---|---|---|---|---|---|---|
| Example 1 | 0.002 | 0.05 | 1.0 | OFC wire | Good | 0.89 |
| Comparative Example 1 | 0.0005 | 0.05 | 1.0 | OFC wire | Good | >10 |
| Comparative Example 2 | 0.001 | 0.05 | 1.0 | OFC wire | Good | >10 |
| Example 2 | 0.010 | 0.01 | 1.0 | OFC wire | Good | 0.77 |
| Comparative Example 3 | 0.010 | 0.006 | 1.0 | OFC wire | Bad | >10 |
| Comparative Example 4 | 0.010 | 0.008 | 1.0 | OFC wire | Bad | >10 |
| Example 3 | 0.010 | 0.05 | 0.3 | OFC wire | Good | 0.72 |
| Comparative Example 5 | 0.010 | 0.05 | 0.1 | OFC wire | Bad | — |
| Comparative Example 6 | 0.010 | 0.05 | 0.2 | OFC wire | Bad | — |
| Example 4 | 0.010 | 0.05 | 1.0 | OFC wire | Good | 0.68 |
| Comparative Example 7 | Silver plating layer (2 μm) | | | OFC wire | Good | 0.75 |
| Comparative Example 8 | Tin plating layer (4 μm) | | | OFC wire | Good | 0.82 |

It is regarded, in general, that Z. C. T. is preferable to be within 3 seconds. As shown in the Table 1, it can be understood that in a case where the gold plating layer has a thickness thinner than 0.002 μm and the palladium plating layer has a thickness thinner than 0.01 μm, the solder wettability was lowered. Further, it can be understood that in a case where the palladium plating layer has a thickness thinner than 0.01 μm and the nickel plating layer has a thickness thinner than 0.3 μm, the weldability was lowered.

Next, the lead wires of Examples 1-4 and the lead wire of Comparative Example 7 produced in the same manner as those of the solder wettability test described above were used as measurement samples and the following acceleration test by a sulfidizing gas was carried out to evaluate an effect of pollution with the sulfidizing gas on the solder wettability. The evaluation results are shown in Table 2.

[Sulfidizing Gas Test]

After each lead wire was immersed in an aqueous ammonium sulfide solution (sulfur component: 0.2 vol/vol %) for 3 minutes, each lead wire was washed with water. Using the lead wire after immersed in the aqueous ammonium sulfide solution, the solder wettability test same as described above was carried out and Z. C. T. was measured.

TABLE 2

|  | Z.C.T. (sec) |
|---|---|
| Example 1 | 1.42 |
| Example 2 | 1.35 |
| Example 3 | 1.30 |
| Example 4 | 1.26 |
| Comparative Example 7 | >10 |

As shown in Table 1, the lead wire having a silver plating layer showed excellent solder wettability immediately after plating. However, as shown in Table 2, it can be understood that the solder wettability of the lead wire was considerably deteriorated by sulfurization. Specifically, the lead wire having a silver plating layer has a problem that the solder wettability is deteriorated by sulfidizing gas generated at the time of thermal polymerization to form a solid conductive layer and a sulfur component in air in a case where an electrolytic capacitor is left for a log time after forming the plating layer. On the other hand, the lead wire having a gold plating layer, a palladium plating layer, and a nickel plating layer, each of which has a constant thicknesses, has excellent solder wettability even when it is subjected to sulfidizing gas. Consequently, it is found that the lead wire of the present example can be preferably used for a solid electrolytic capacitor having a solid electrolyte layer.

Next, with respect to solid electrolytic capacitors produced by using the lead wires of Examples 1-4 and the lead wire of Comparative Example 8, respectively, the following whisker test was carried out. The evaluation results are shown in Table 3.

[Whisker Test]

After each solid electrolytic capacitor was stored for 1,000 hours under an environment of 60° C. and 90% RH, the solid electrolytic capacitor was taken in room-temperature atmosphere and the surface of the lead wire was observed by a scanning electron microscope (SEM) with 300 times magnification to observe presence or absence of whisker generation.

TABLE 3

|  | Generation of whisker |
|---|---|
| Example 1 | Absence |
| Example 2 | Absence |
| Example 3 | Absence |
| Example 4 | Absence |
| Comparative Example 8 | Presence |

As shown in the Table 3, whisker was observed on the lead wire having a silver plating layer. On the other hand, no whisker was observed on the lead wire having a gold plating layer, a palladium plating layer, and a nickel plating layer, each of which has a constant thickness, even after the lead wires were stored under high temperature and high humidity. Accordingly, there is no need to carry out heat treatment or washing treatment for removing whisker in production process by using the lead wire of the present example and the lead wire can also be used preferably for an electrolytic capacitor to be used under high temperature.

In addition, when the characteristics of solid electrolytic capacitors produced by using the lead wires of the examples were evaluated, the solid electrolytic capacitors had characteristics sufficient for practical use without any particular problems and no short circuit defect was caused.

The present application claims a priority based on Japanese Patent Application No. 2008-159001 filed on Jun. 18, 2008, the content of which is hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. An electrolytic capacitor comprising a capacitor element having an anode foil connected with an anode lead tab terminal and a cathode foil connected with a cathode lead tab terminal that are wound with a separator interposed therebetween, an outer casing housing the capacitor element, and a sealing body for sealing an opening part of the outer casing, wherein the anode lead tab terminal and the cathode lead tab terminal respectively have a lead wire welded with a boss member of the lead tab terminal and led out to the outside, wherein the lead wires respectively have a nickel plating layer, a palladium plating layer, and a gold plating layer in this order on the surface of a substrate, and the nickel plating layer has a thickness of 0.3 to 5.0 µm, the palladium plating layer has a thickness of 0.01 to 0.10 µm, and the gold plating layer has a thickness of 0.002 to 0.030 µm.

2. The electrolytic capacitor according to claim 1, wherein the substrate of the lead wire is made of an Oxygen-Free Copper wire or a Copper-Plated steel wire.

3. The electrolytic capacitor according to claim 1, wherein the nickel plating layer, the palladium plating layer, and the gold plating layer are respectively formed by an electrolytic plating method.

* * * * *